United States Patent
Shiitani et al.

(12) 
(10) Patent No.: US 6,320,578 B1
(45) Date of Patent: Nov. 20, 2001

(54) IMAGE SHADOW ELIMINATION METHOD, IMAGE PROCESSING APPARATUS, AND RECORDING MEDIUM

(75) Inventors: Shuichi Shiitani; Masaki Watanabe; Susumu Endo, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/177,824

(22) Filed: Oct. 23, 1998

(30) Foreign Application Priority Data

Jun. 2, 1998 (JP) .................................................. 10-153280

(51) Int. Cl.$^7$ .................................................. G06T 15/00
(52) U.S. Cl. ........................................... 345/419; 345/426
(58) Field of Search .................................. 345/419, 426; 382/174, 274, 311

(56) References Cited

U.S. PATENT DOCUMENTS 5,912,992 * 6/1999 Sawada et al. ...................... 382/274
5,990,901 * 11/1999 Lawton et al. ........................ 345/429

FOREIGN PATENT DOCUMENTS 7-262410  10/1995 (JP) .
9-261464  10/1997 (JP) .

OTHER PUBLICATIONS

Bouknight et al.,"An Algorithm for Producing Half–Tone Computer Graphics Presentations with Shadows and Movable Light Sources".*

* cited by examiner

Primary Examiner—Mark Zimmerman
Assistant Examiner—Lance W. Sealey
(74) Attorney, Agent, or Firm—Staas & Halsey LLP

(57) ABSTRACT

In a shadow elimination method and apparatus and a recording medium, a three-dimensional model is superimposed on a picture of a three-dimensional object contained in an image so as to fit the model to the picture. When the plane on which a shadow is created in the picture is designated, a position of a light source is estimated based on the plane of the three-dimensional model which is superimposed on the designated plane. Then, an area on which a shadow is to be created by a rendering for the three-dimensional model is searched from the estimated position of the light source. The area on which the searched plane is superimposed is decided to be the shadow area of the image and the shadow is eliminated from the shadow area.

29 Claims, 15 Drawing Sheets

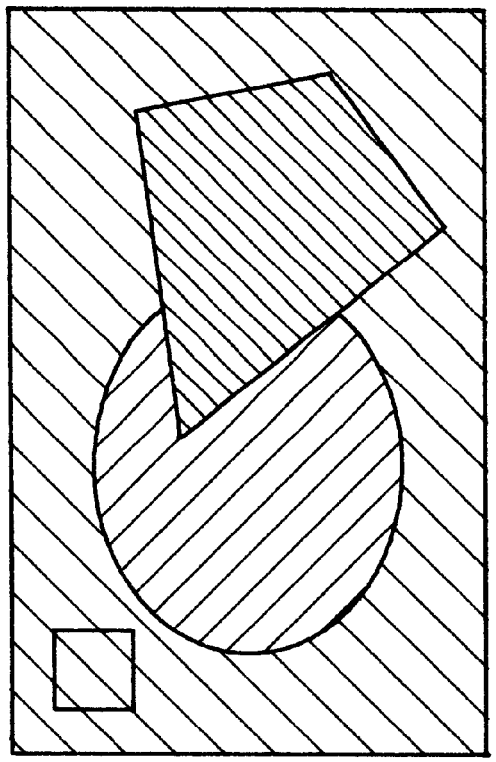
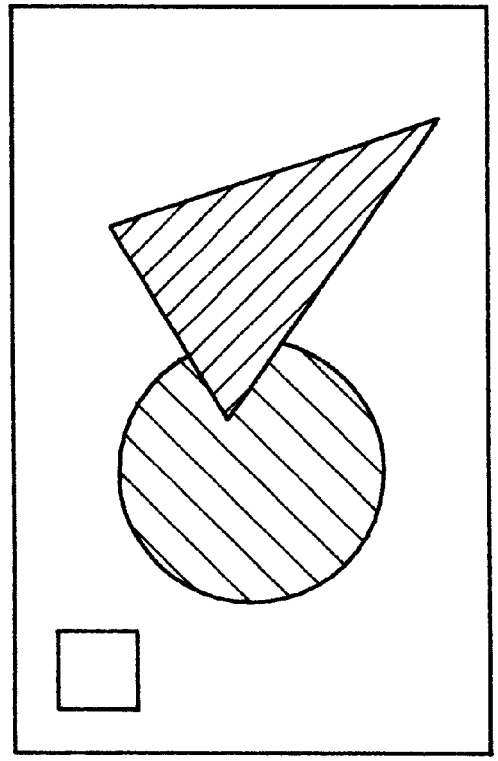
FIG. 13

FIG. 14
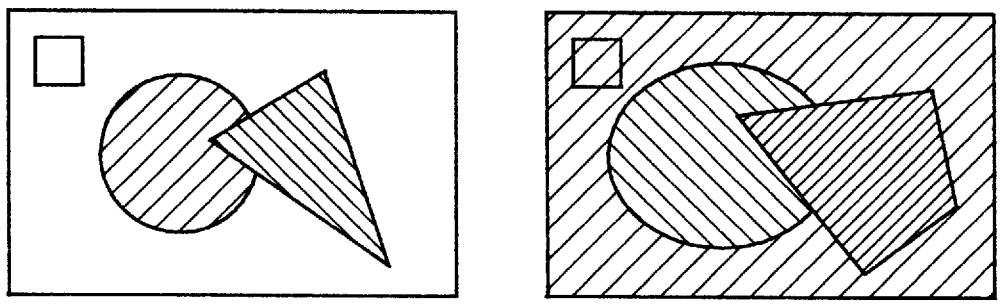
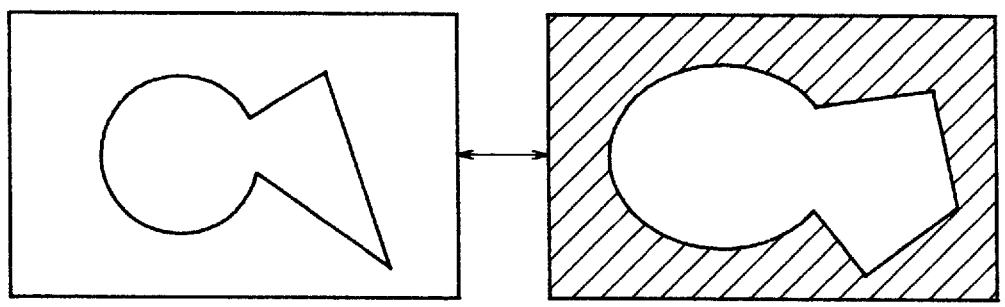
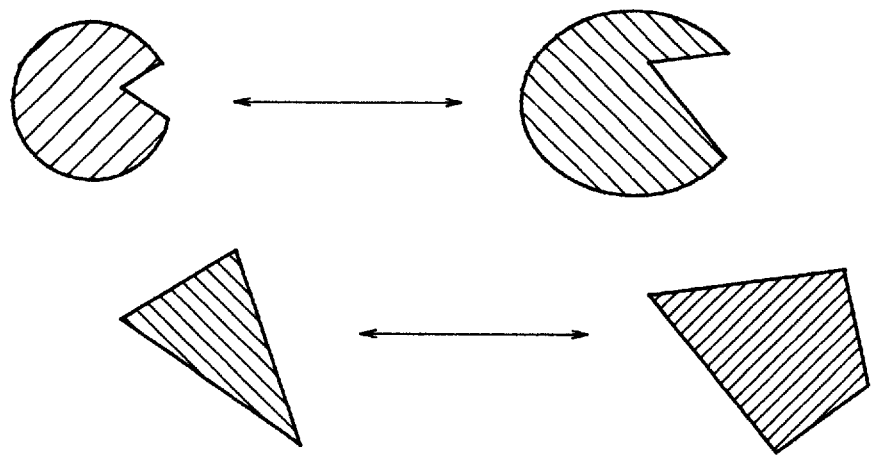

IMAGE SHADOW ELIMINATION METHOD, IMAGE PROCESSING APPARATUS, AND RECORDING MEDIUM

BACKGROUND OF THE INVENTION

The present invention relates to a method of eliminating shadows contained in an image when a photographic image taken with a video camera, a still camera, or the like is pasted on the surface of a 3-D model (texture mapping), for example, in authoring 3-D contents, and further relates to an image processing apparatus provided with a function of eliminating shadows contained in an image and a recording medium readable by the image processing apparatus.

In authoring 3-D contents, the texture mapping technique of pasting an image on the surface of a 3-D model is used so that texture will be well expressed and a realistic atmosphere can be created.

However, when a photographic image taken with a video camera, a still camera, or the like is pasted on the surface of a 3-D model, the photographic image is shaded by the rendering performed at the final stage of the 3-D graphics process, which requires an operation to eliminate the shadows.

Conventionally, the elimination of shadows from images is conducted by operators' manual work with photo-retouching software.

The procedure is as follows. At first, shadow areas are designated: the shadow areas are roughly designated by setting an approximate color range, and then minute portions are corrected by manual work.

Then, the contrast and the brightness of the designated areas are changed in order to make the areas have the same color as the portions with no shadows.

However, such an operation of changing the contrast and the brightness of the designated areas by using the photo-retouching software requires skill, so that even professional designers cannot produce satisfactory works without sufficient experience.

BRIEF SUMMARY OF THE INVENTION

The present invention has been devised to solve these problems and has an object of providing an image shadow elimination method which allows users with no photo-retouching knowledge to eliminate shadows by simple operations by estimating the position of a light source by superimposing a 3-D model on an image containing shadows and eliminating the shadows from the areas where the shadows will be created by the rendering for the 3-D model at the position of the light source, further providing an image processing apparatus provided with a function of eliminating shadows, and a recording medium readable by the image processing apparatus.

The present invention is characterized by superimposing a three-dimensional model on the picture of the three-dimensional object contained in the image so as to fit the three-dimensional model to the picture; designating a shadow plane of the picture of the three-dimensional object contained in the image; estimating the position of a light source, based on a plane of the three-dimensional model superimposed on the designated plane; searching an area on which a shadow is to be created by a rendering for the three-dimensional model based on the estimated position of the light source, and deciding that an area on which the searched out plane is superimposed is a shadow area of the image; and eliminating the shadow from the area which has been decided as the shadow area.

Consequently, users with no photo-retouching knowledge can eliminate the shadow contained in the image by simple operations of superimposing a 3-D model on the image so as to fit the shape to the picture and designating the plane of the shadow contained in the image.

The present invention is further characterized by superimposing a three-dimensional model on the picture of the three-dimensional object contained in the image so as to fit the three-dimensional model to the picture; designating a point on the picture of the three-dimensional object contained in the image and a position of the point on a shadow; estimating a position of a light source, based on a point and position of the three-dimensional model superimposed on the picture of the three-dimensional object corresponding to the designated point and position; deciding that an area on which a shadow is created by a rendering for the three-dimensional model based on the light source at the estimated position is the shadow area of the image; and eliminating the shadow from the area which has been decided as the shadow area.

Consequently, users with no photo-retouching knowledge can eliminate the shadow contained in the image by simple operations of superimposing a 3-D model on the image so as to fit the shape to the picture and designating a point on the photographic image of a three-dimensional object contained in the image and the position of the point in the shadow.

The present invention is further characterized by superimposing a three-dimensional model on the picture of the three-dimensional object contained in the image so as to fit the three-dimensional model to the picture; designating a position of a light source; searching an area on which a shadow is to be created by a rendering for the three-dimensional model based on the designated position of the light source; changing the position of the light source when the shadow created by the rendering does not agree with a shadow of the image; deciding that the area on which the shadow is created by the rendering is the shadow area of the image when the shadow created by the rendering agrees with the shadow of the image; and eliminating the shadow from the area which has been decided as the shadow area.

Consequently, users with no photo-retouching knowledge can eliminate the shadow contained in the image by simple operations of superimposing a 3-D model on the image so as to fit the shape to the picture, designating the position of the light source, and changing the position of the light source until the shadow created by the rendering for the 3-D model agrees with the shadow contained in the image.

The present invention is further characterized by, when a shadow is eliminated from the area which has been decided as a shadow area, calculating a pixel distribution of an area which has been decided as a shadow area and a pixel distribution of an area other than the shadow area in the image; calculating a conversion function, based on the pixel distributions, for converting the pixel distribution of the shadow area into a pixel distribution in accordance with the pixel distribution of the area other than the shadow area; and converting the pixel distribution of the shadow area by the conversion function.

Consequently, the shadow contained in the image is eliminated without operating the contrast and the brightness of the shadow area.

The present invention is further characterized by, when a shadow is eliminated from the area which has been decided as a shadow area, calculating a pixel distribution of a portion of an area which has been decided as a shadow area and a pixel distribution of a portion of the area other than the shadow area in the image, the portions being same in color; calculating a conversion function for converting the pixel distribution of the shadow area into a pixel distribution in accordance with the calculated pixel distribution; and converting the pixel distribution of the shadow area by the conversion function.

Consequently, the shadow contained in the image is eliminated by simple operations of designating a portion in a shadow area and a portion in the other area which are same in color, without changing the contrast and the brightness of the shadow area. The shadow is eliminated without this designation when the image processing apparatus is provided with a function of distinguishing a portion in the shadow area and a portion in the other area which are same in color.

The present invention is further characterized by, when a shadow is eliminated from the area which has been decided as a shadow area, calculating pixel distributions of respective portions in an area which has been decided as a shadow area and pixel distributions of respective portions which have same colors as the respective portions of the shadow area, respectively in an area other than the shadow area in the image; calculating conversion functions for converting the pixel distributions of the respective portions having the same colors in the shadow area into pixel distributions in accordance with the pixel distributions of the respective portions in the area other than the shadow area, based on the calculated pixel distributions; and converting the pixel distributions of the respective portions in the shadow area by the conversion functions, respectively.

Consequently, the shadow contained in the image is eliminated by simple operations of designating each portion in a shadow area and each portion in the other area which are same in color, without changing the contrast and the brightness of the shadow area. The shadow is eliminated without this designation when the image processing apparatus is provided with a function of distinguishing a portion in the shadow area and a portion in the other area which are same in color.

The above and further objects and features of the invention will more fully be apparent from the following detailed description with accompanying drawings.

BRIEF DESCRIPTION OF THE SEVERAL VIEWS OF THE DRAWING

FIG. 13 is an example of an operation for the shadow elimination unit (No. 2);

FIG. 14 is an example of another operation for the shadow elimination unit (No. 2)

DETAILED DESCRIPTION OF THE INVENTION

Figure 1:
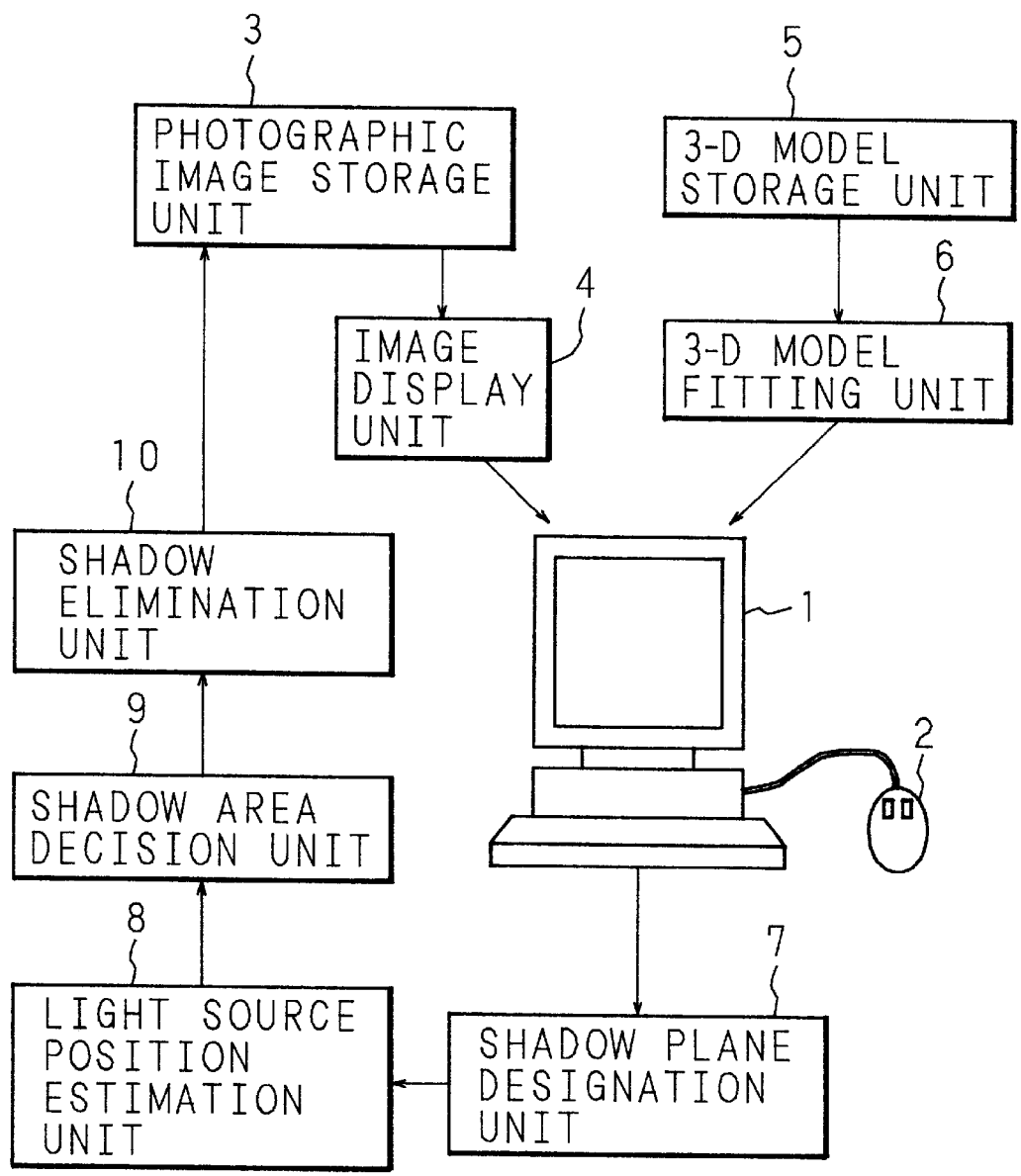
FIG. 1 is a block diagram of Embodiment 1 of the present invention.

FIG. 1 shows a block diagram of Embodiment 1 of an image processing apparatus which performs the shadow elimination method of the present invention.

A display 1 displays photographic digital images, 3-D models, and the like, and a mouse 2 as a pointing device enters coordinate positions on the display 1.

A photographic image storage unit 3 stores digital images taken by a camera, a video camera, or the like and processed digital images from which shadows have been eliminated.

An image display unit 4 displays the photographic digital images taken from the photographic image storage unit 3 on the display 1.

A 3-D model storage unit 5 stores shape data including telescopic wire frame models and surface models.

A 3-D model fitting unit 6 superimposes a 3-D model selected by an operator from the 3-D models stored in the 3-D model storage unit 5 on an object having a three-dimensional shape contained in a photographic digital image displayed on the display unit 1 according to the operator's operation, thereby to fit the 3-D model to the three-dimensional shape of the object contained in the photographic digital image by rotating, reducing, or enlarging the 3-D model in accordance with the operator's instruction for the adjustment of the position, direction, and size and the partial transformation of the shape.

The fitting of a 3-D model is realized by, for example, the method disclosed in Japanese Patent Application Laid-Open No. 7-262410 (1995).

A shadow plane designation unit 7 secures the data of the shadow plane of the object having a three-dimensional shape designated by the operator using the mouse 2 for the photographic digital image on which the 3-D model is superimposed shown on the display 1, namely, the data of the plane of the 3-D model superimposed on the shadow surface.

A light source position estimation unit 8 estimates the position of a light source of a type (for example: parallel light, point light source) which is designated by a click operation of an operator using the mouse 2, based on the data of the plane of the 3-D model secured by the shadow plane designation unit 7.

A shadow area decision unit 9 searches for the shadow plane which has not been designated by the mouse 2 but is supposed to be the shadow plane created by the rendering based on the light source position estimated by the light source position estimation unit 8. When a shadow plane not designated yet remains, the shadow area decision unit 9 secures the data of the 3-D model plane of this shadow plane and decides that both the secured data and the data of the 3-D model plane secured by the shadow plane designation unit 7 are the shadow areas of the photographic digital image. When no such shadow plane remains, the shadow area decision unit 9 decides that only the data of the 3-D model plane secured by the shadow plane designation unit 7 is the shadow area of the photographic digital image.

A shadow elimination unit 10 eliminates the shadows from the photographic digital image by adjusting the contrast and the brightness of the shadow area in the photographic digital image decided by the shadow area decision unit 9, and stores the processed photographic digital image in the photographic image storage unit 3.

Figure 2:
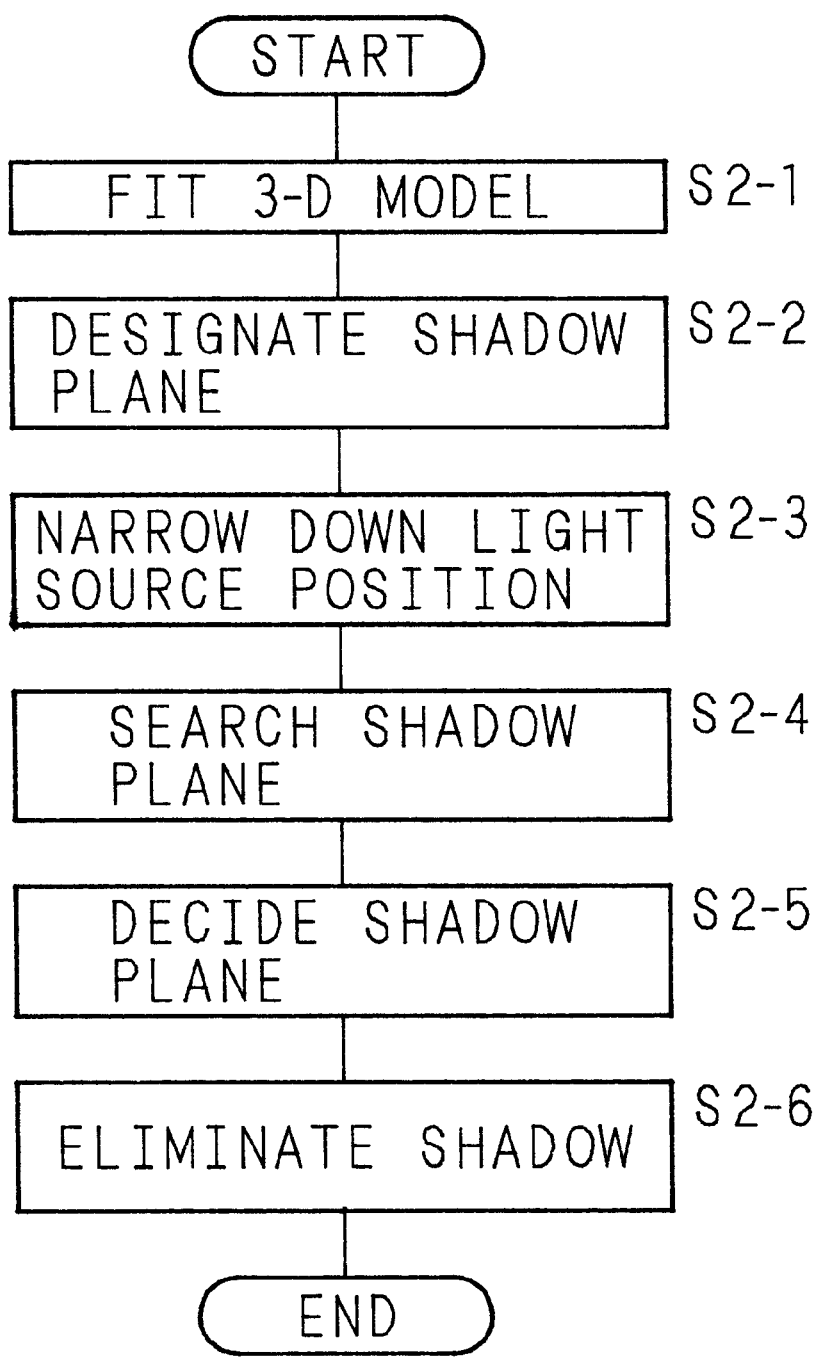
FIG. 2 is the operation flowchart of Embodiment 1.

The operation of Embodiment 1 will be described as follows, based on a flowchart of FIG. 2, a photographic image shown in FIG. 9, an example of a 3-D model shown in FIG. 10, and an example of fitting a 3-D model on the photographic image shown in FIG. 11.

Figure 9:
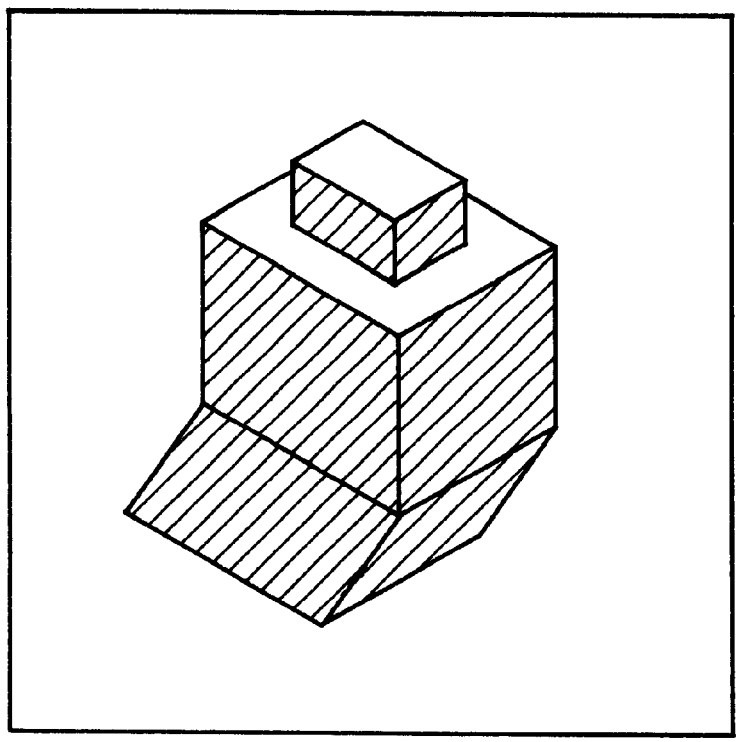
FIG. 9 is an example of a photographic image.
Figure 10:
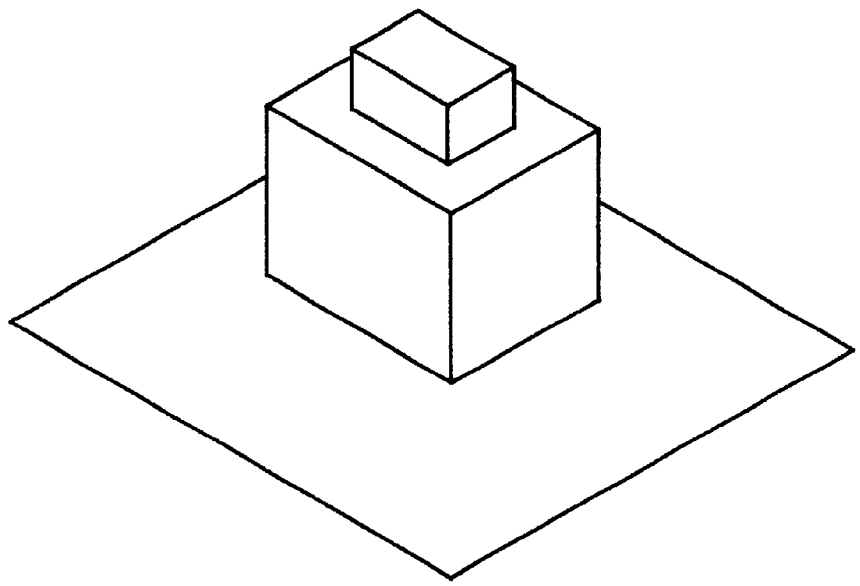
FIG. 10 is an example of a 3-D model.
Figure 11:
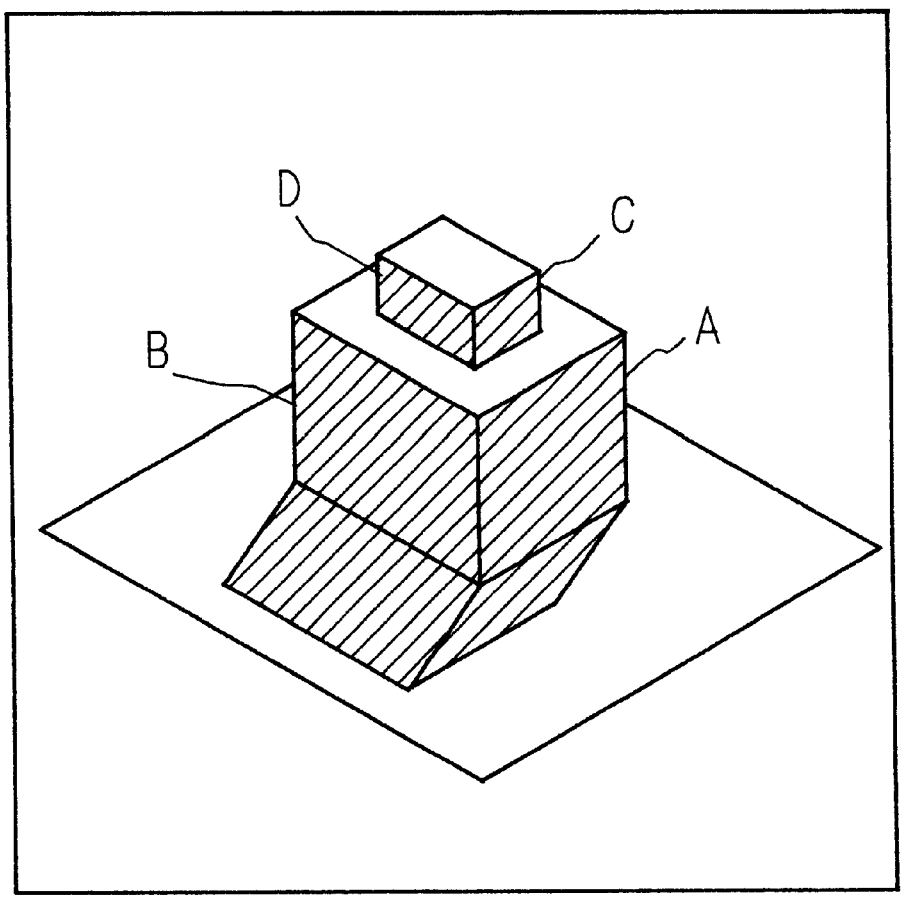
FIG. 11 is an example of a 3-D model superimposed on a photographic image.

The 3-D model fitting unit 6 superimposes a 3-D model as shown in FIG. 10, which has been selected for its resemblance in shape to an object having a three-dimensional shape contained in the photographic digital image shown in FIG. 9 by an operator from the 3-D models stored in the 3-D model storage unit 5, on the object contained in the photographic digital image of FIG. 9 shown on the display unit 1 in accordance with the operator's instruction, thereby to fit the 3-D model to the three-dimensional shape of the object by rotating, reducing, or enlarging the 3-D model in accordance with the operator's instruction for the adjustment of the position, direction, and size and the partial transformation of the shape as shown in FIG. 11 (step S2-1).

The shadow plane designation unit 7 secures the data of the shadow plane of the object having a three-dimensional shape contained in the photographic digital image on which the 3-D model is superimposed as shown on the display 1, which has been designated by the operator using the mouse 2, namely, the data of the plane of the 3-D model superimposed on the shadow plane (step S2-2).

The light source position estimation unit 8 narrows down the position of the light source of a type designated, for example, by a click operation of the mouse 2 by the operator, based on the data of the plane of the 3-D model secured by the shadow plane designation unit 7 (step S2-3).

The shadow area decision unit 9 searches for the remaining shadow plane which is supposed to be the shadow plane created by the rendering based on the light source position estimated by the light source position estimation unit 8 (step S2-4), secures the data of the 3-D model plane of this shadow plane, and decides that both the secured data and the data of the 3-D model plane secured by the shadow plane designation unit 7 are the shadow areas of the photographic digital image (step S2-5).

For example, when the shadow plane A is designated among shadow planes A to D shown in FIG. 11, this means that the light source is at the back of the shadow plane A (negative direction of the normal line). This also means that the plane C is another shadow plane. When the shadow plane B is further designated, the fact that the planes A and B are shadow planes means that the light source is at the back of the shadow planes A and B at the same time. This means that the plane D is another shadow plane.

For example, when only the shadow planes A and B are designated by the operator, the data of the 3-D model planes of the remaining shadow planes C and D on which the 3-D model planes to be shaded by the rendering at the estimated light source position are superimposed is secured, and it is decided that both the secured data and the data of the 3-D model planes of the shadow planes A and B secured by the shadow plane designation unit 7 are shadow areas of the photographic digital image.

The shadow elimination unit 10 eliminates shadows from a photographic digital image by adjusting the contrast and the brightness of the shadow areas of the photographic digital image decided by the shadow area decision unit 9 in accordance with the algorithm which will be described later (step S2-6).

Figure 3:
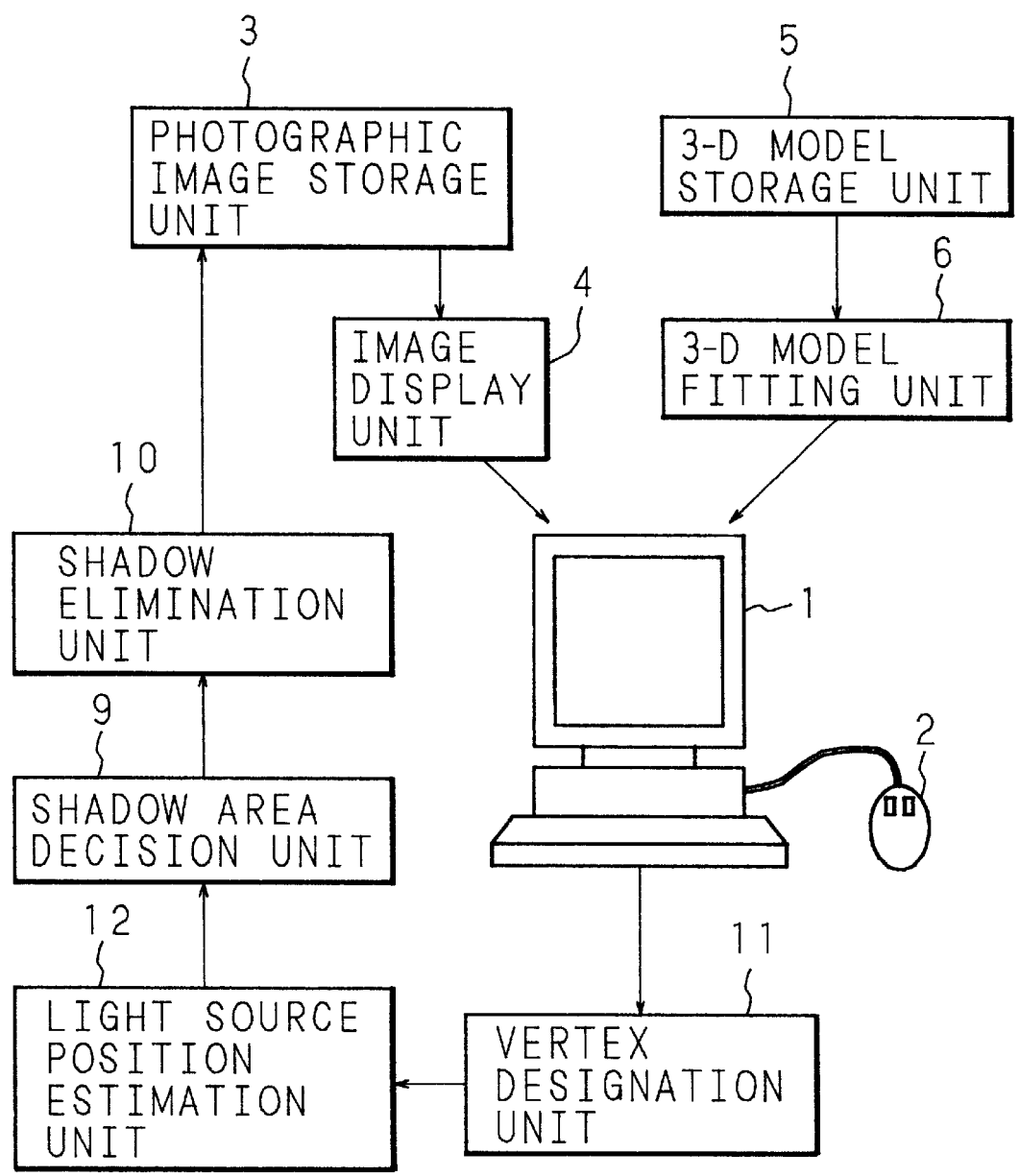
FIG. 3 is a block diagram of Embodiment 2 of the present invention.

FIG. 3 is a block diagram of Embodiment 2 of the image processing apparatus which performs the shadow elimination method of the present invention. The same units as those in Embodiment 1 are referred to with the same reference numbers and their explanation is omitted.

In Embodiment 1 the light source position is estimated by the designation of a shadow plane by an operator, whereas in the present embodiment the light source position is estimated from the position of a vertex and the position of its shadow.

A vertex designation unit 11 detects the vertex of the object having a three-dimensional shape contained in the photographic digital image on which a 3-D model is superimposed and displayed on the display 1, which is designated by the operator using the mouse 2, and also detects the three-dimensional position of the shadow formed by the vertex.

A light source position estimation unit 12 estimates the position of the light source of a type which is designated, for example, by the a click operation of the mouse 2 by the operator from the two three-dimensional positions detected by the vertex designation unit 11.

The shadow area decision unit 9 calculates a shadow area created by the rendering based on the light source position estimated by the light source position estimation unit 12.

Figure 4:
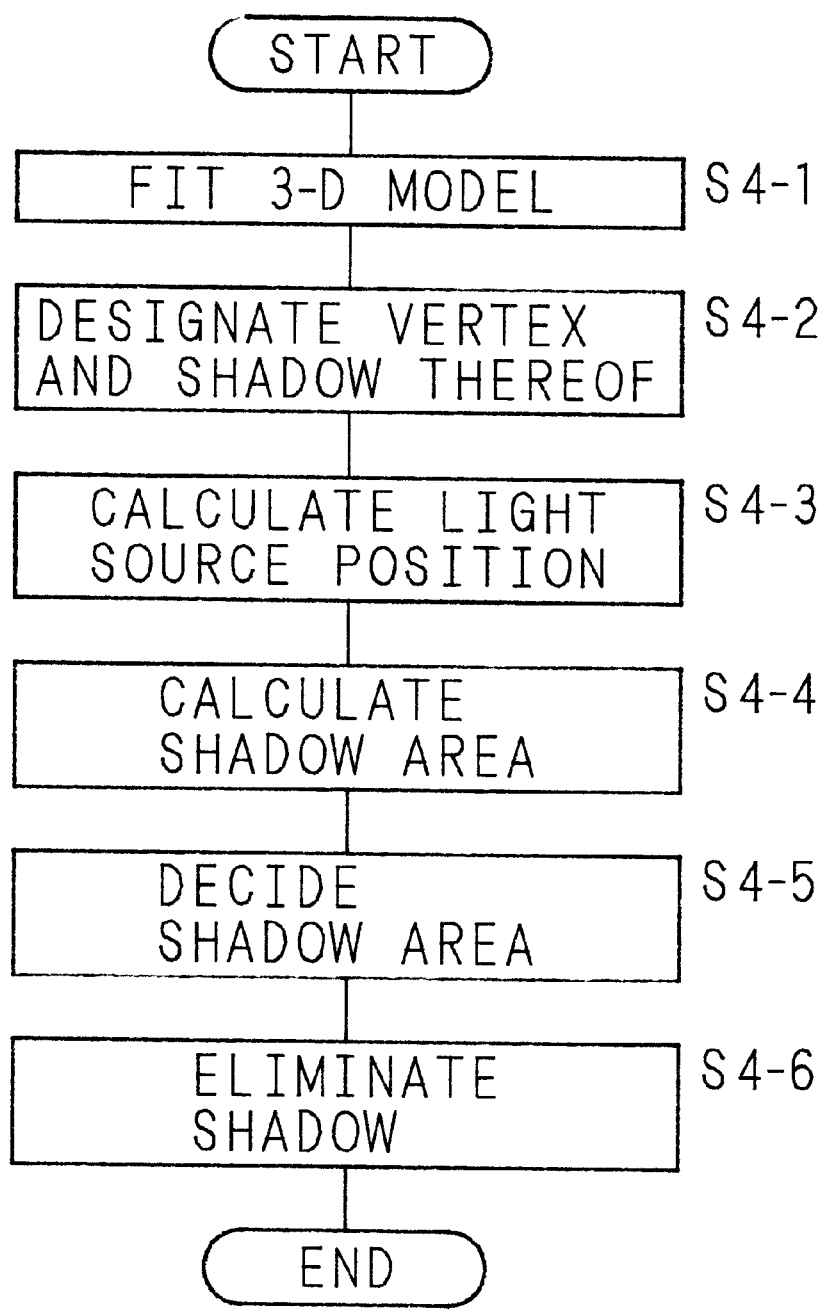
FIG. 4 is the operation flowchart of Embodiment 2.
Figure 12:
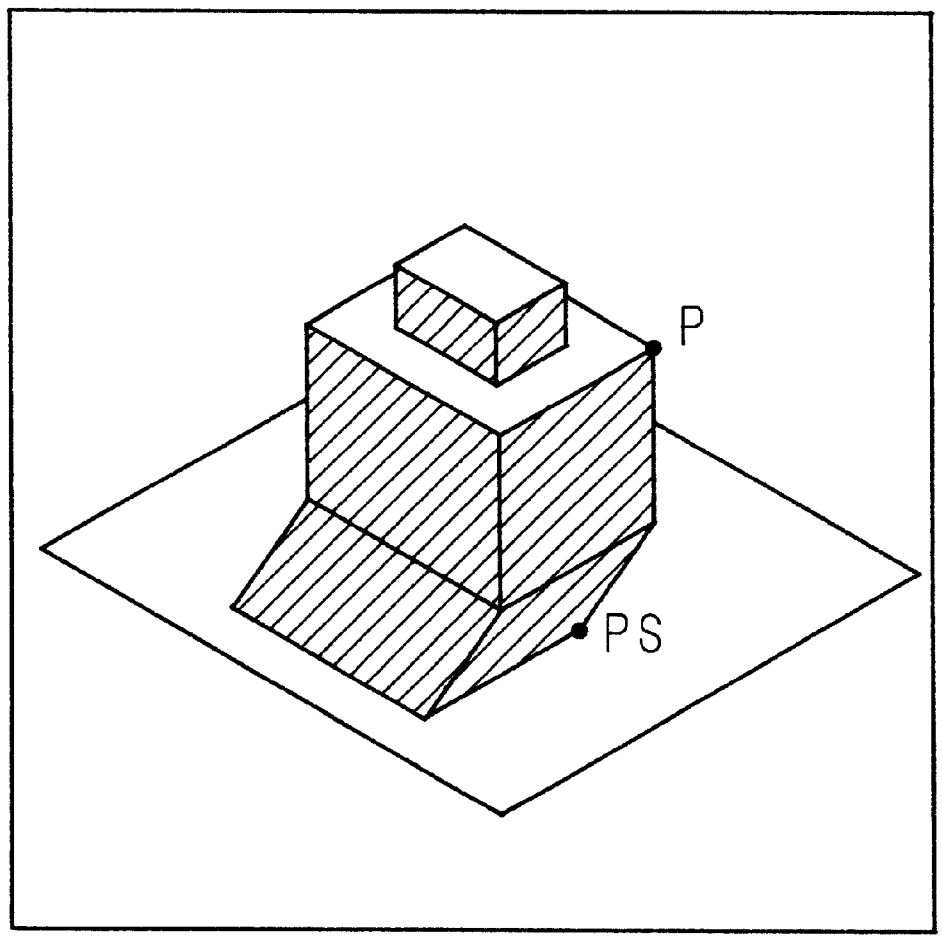
FIG. 12 is an example of designating a vertex and its shadow.

The operation of Embodiment 2 will be described based on a flowchart of FIG. 4 and an example of the designation of a vertex and its shadow shown in FIG. 12.

The 3-D model fitting unit 6 superimposes a 3-D model shown in FIG. 10, which has been selected for its resemblance in shape to the object having a three-dimensional shape contained in the photographic digital image shown in FIG. 9 by an operator from the 3-D models stored in the 3-D model storage unit 5, on the object contained in the photographic digital image of FIG. 9 shown on the display unit 1 in accordance with the operator's instruction, thereby to fit the 3-D model to the three-dimensional shape of the object contained in the photographic digital image by rotating, reducing, or enlarging the 3-D model in accordance with the operator's instruction for the adjustment of the position, direction, and size and the partial transformation of the shape (step S4-1).

The vertex designation unit 11 detects the vertex of the object having a three-dimensional shape contained in the photographic digital image on which a 3-D model is superimposed as shown on the display 1 which has been designated by the operator using the mouse 2, and further detects the three-dimensional coordinate of the position of the shadow created by the vertex (step S4-2). For example, when the vertex P and its shadow position PS shown in FIG. 12 are designated by the operator, the data of the three-dimensional coordinate of the 3-D model which is superimposed on the summit P and the shadow position PS is secured.

The light source position estimation unit 12 calculates the position of a light source of a type designated, for example, by the operator's click operation of the mouse 2, based on the three-dimensional coordinate of the position of the vertex and the position of its shadow detected by the vertex designation unit 11 (step S4-3).

When the light source emits parallel light such as sun light, the light source is considered to locate in the direction of an extension of the straight line P-PS. When the light source is a point light source, the light source position can be estimated by triangulation by designating the positions of two vertexes and the positions of the respective shadows.

The shadow area decision unit 9 calculates a shadow area created by the rendering based on the light source position estimated by the light source position estimation unit 12 (step S4-4), and decides that this shadow area is the shadow area of the photographic digital image (step S4-5).

The shadow elimination unit 10 eliminates the shadows from the photographic digital image by adjusting the contrast and the brightness of the shadow areas of the photographic digital image decided by the shadow area decision unit 9 in accordance with the algorithm which will be described later (step S4-6).

Figure 5:
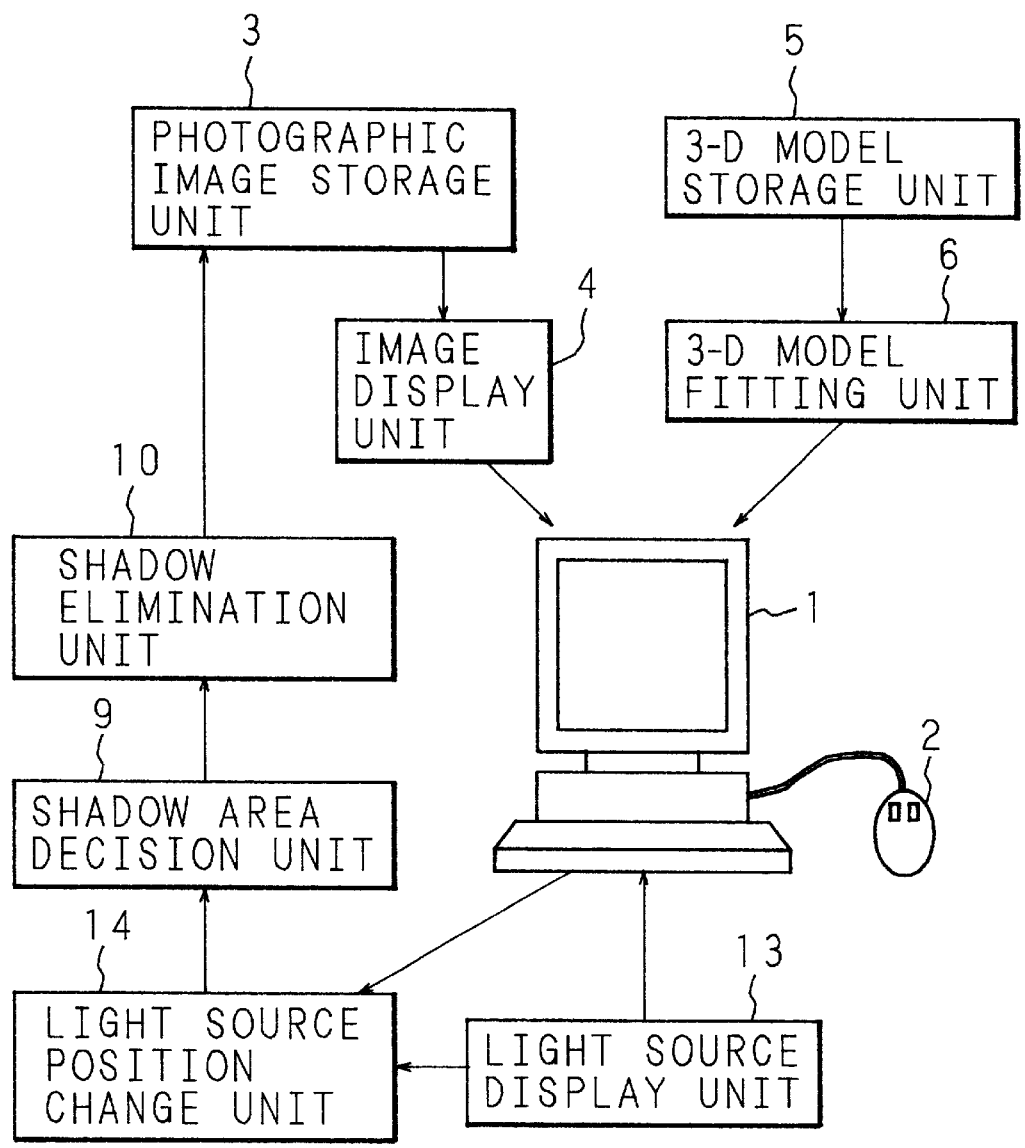
FIG. 5 is a block diagram of Embodiment 3 of the present invention.

FIG. 5 is a block diagram of Embodiment 3 of the image processing apparatus which performs the shadow elimination method of the present invention. The same units as those in Embodiment 1 are referred to with the same reference numbers and their explanation is omitted.

In Embodiments 1 and 2 the light source position is estimated from more than one shadow plane and from the positions of the vertex and its shadow, respectively. In contrast, in the present embodiment the light source position is changed so as to agree the shadow created by the rendering with a type (example: parallel light, point light source) at the light source position arbitrarily set in advance with the shadow of a photographic digital image.

A light source display unit 13 displays the shadow created by the rendering with the arbitrarily set type of the light source of computer graphics set at an arbitrary position in the photographic digital image on which a 3-D model is superimposed as shown on the display 1.

A light source position change unit 14 moves the position of the light source in accordance with the operator's operation of the mouse 2.

The shadow area decision unit 9 decides that the shadow area created by the rendering at the light source position, which is changed by the light source position change unit 14 and in which the shadow created by the rendering agrees with the shadow of the photographic digital image, is the shadow area of the photographic digital image.

Figure 6:
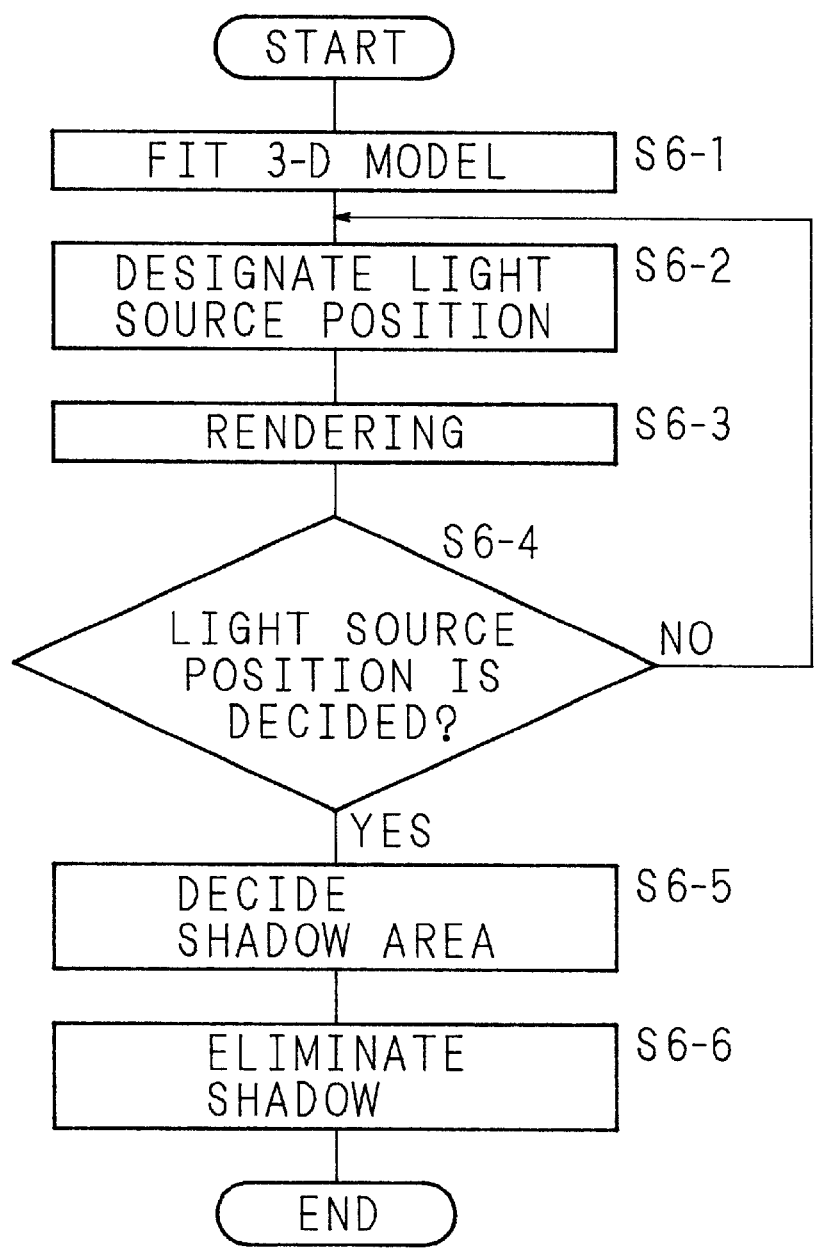
FIG. 6 is the operation flowchart of Embodiment 3.

The operation of Embodiment 3 will be described based on a flowchart shown in FIG. 6.

The 3-D model fitting unit 6 superimposes a 3-D model shown in FIG. 10, which has been selected for its resemblance in shape to the object having a three-dimensional shape contained in the photographic digital image shown in FIG. 9 by an operator from the 3-D models stored in the 3-D model storage unit 5, on the object contained in the photographic digital image of FIG. 9 as shown on the display unit 1 in accordance with the operator's instruction, thereby to fit the 3-D model to the three-dimensional shape of the object contained in the photographic digital image by rotating, reducing, or enlarging the 3-D model in accordance with the operator's instruction for the adjustment of the position, direction, and size and the partial transformation of the shape (step S6-1).

The light source display unit 13 designates a light source of computer graphics of a specified type at an arbitrary position in the photographic digital image on which a 3-D model is superimposed (step S6-2), and displays the shadow created by the rendering at this light source position (step S6-3).

The operator compares the shadow created by the rendering and the shadow of the photographic digital image and judges that the shadows agree with each other so that whether the light source position is decided or not is determined (step S6-4). When the operator decides that they do not agree and moves the light source position to another position by operating the mouse 2 (step S6-4, NO), the light source position change unit 14 moves the light source position in accordance with the operator's operation of the mouse 2 (step S6-2).

When the operator decides that the shadow created by the rendering and the shadow of the photographic digital image agree with each other and decides the light source position after repeating such movement of the light source position (step S6-4, YES), the shadow area decision unit 9 decides that the shadow area created by the rendering at this light source position is the shadow area of the photographic digital image (step S6-5).

The shadow elimination unit 10 eliminates the shadows from the photographic digital images by adjusting the contrast and the brightness of the shadow areas of the photographic digital image decided by the shadow area decision unit 9 in accordance with the algorithm which will be described later (step S6-6).

Figure 7:
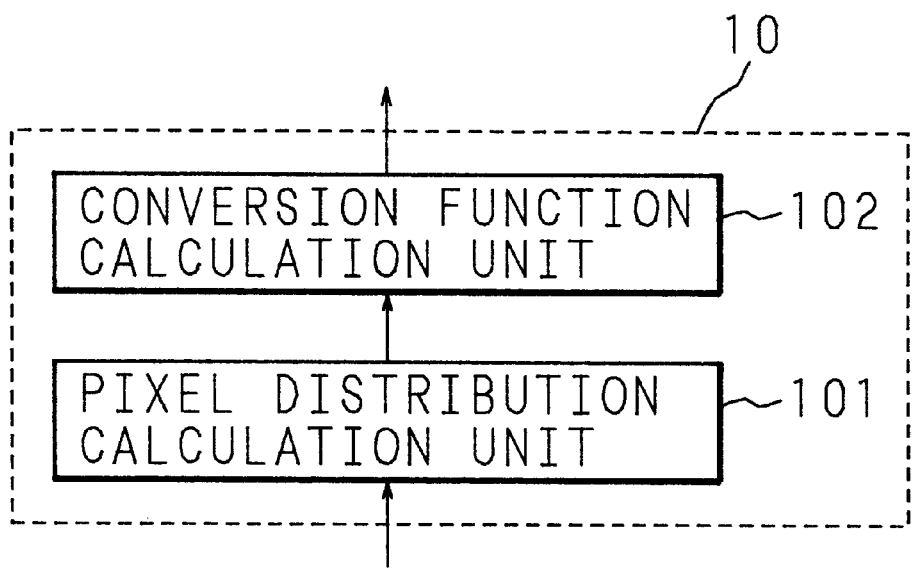
FIG. 7 is a detailed block diagram of a shadow elimination unit (No. 1)

FIG. 7 is a detailed block diagram of an example of the shadow elimination unit 10.

A pixel distribution calculation unit 101 calculates the pixel distribution of a shadow area and the pixel distribution of the area other than the shadow area (hereinafter referred to as sunny area). The pixel distribution can be calculated in an RGB space, a YIQ space, or by converting into a gray scale. The distribution is used to examine mainly the average and the dispersion of pixel values.

A conversion function calculation unit 102 calculates a conversion function for converting the pixel distribution of a shadow area into the pixel distribution of a sunny area. The conversion function is calculated by preparing a plurality of types of conversion functions and substituting the average value or the dispersion value calculated by the pixel distribution calculation unit 101 for the variable of the function.

When the conversion function is obtained, it is applied to the whole shadow area of the image so as to convert the pixel value. As a result, the shadows of the image are eliminated.

Figure 8:
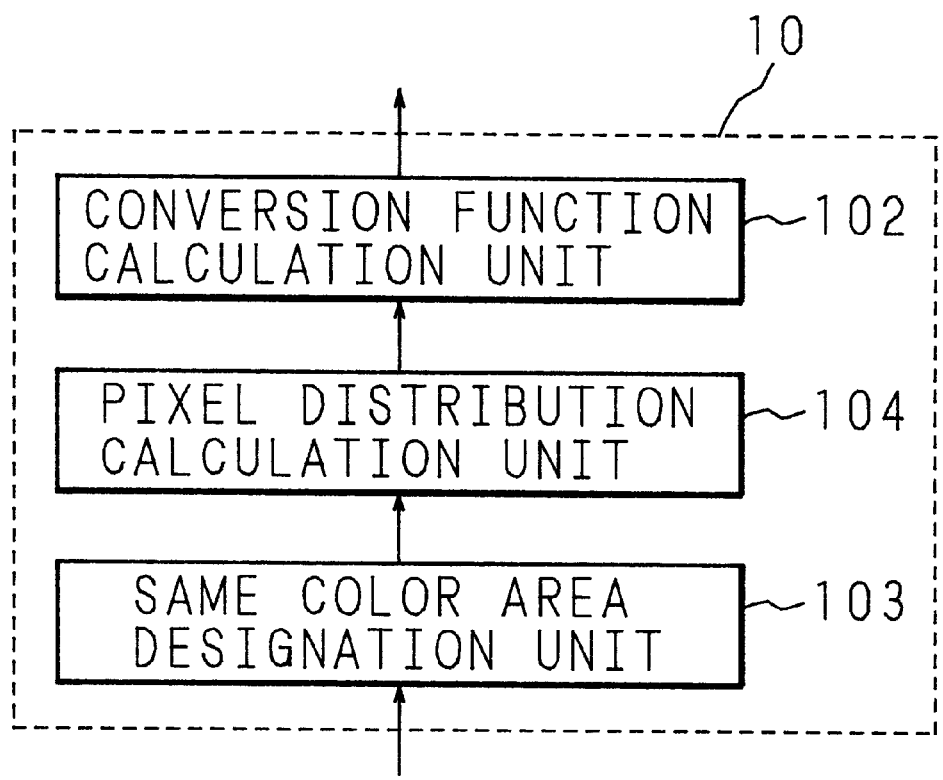
FIG. 8 is a detailed block diagram of a shadow elimination unit (No. 2)

FIG. 8 is a detailed block diagram of another example of the shadow elimination unit 10.

In the present embodiment, when a shadow area has more than one color because it contains designs or the like, the pixel distribution is obtained from a portion of the shadow area and a portion of the sunny area which are same in color.

A same color area designation unit 103 designates an area in the shadow area and another area in the sunny area, which are designated as originally having the same color as each other by the operator using the mouse, as same color areas. When the image processing apparatus is provided with a function of color clustering, the unit 103 divides the area by the clustering and designates respective color areas. The designation of the same color areas can be conducted to a single color or the whole colors.

A pixel distribution calculation unit 104 examines the pixel distribution of the respective areas designated as the same color areas by the same color area designation unit 103.

The conversion function calculation unit 102 calculates a conversion function for converting the pixel distribution of the designated area in the shadow area into the pixel distribution of the designated area in the sunny area. The conversion function is obtained by preparing a plurality of types of conversion functions and substituting the average value or the disperse value obtained by the pixel distribution calculation unit 104 for the variable of the function.

The conversion function thus obtained is applied to the entire shadow areas contained in the image when only one color is designated. When the whole colors are designated, the pixel value of each color area is converted. As a result, the shadows of the image are eliminated.

An example of the procedure to operate the shadow elimination unit having the structure shown in FIG. 8 will be described based on FIG. 13.

In FIG. 13, on the left-side (having white background) is the plane of the sunny area and on the right-side (having hatched background) is the plane of the shadow area. When the backgrounds of these planes, the circle and the oval, the triangle and the square are same in color, respectively, and one of the background, the oval, and the square is designated as the same color area in the sunny area and one of the background, the oval, and the square is designated as the same color area in the shaded area, the level of the darkness of the same color area of the shadow area in comparison with the same color area of the sunny area is calculated and the results are applied to the entire shadow area to brighten the area so as to eliminate the shadows.

An example of the procedure to operate the shadow elimination unit having the structure shown in FIG. 8 will be described based on FIG. 14.

In FIG. 14, on the left-side is the plane of the sunny area and on the right-side is the plane of the shadow area. When the backgrounds of these planes, the circle and the oval, and the triangle and the square are same in color, respectively, and the backgrounds of these planes, the circle and the oval, and the triangle and the square are respectively designated as the same color areas, the level of the darkness of the respective same color area in the shadow area in comparison with the respective same color area in the sunny area is calculated. The results are applied to each color area to brighten the area so as to eliminate the shadows.

The designation of the same color area is not limited to one-to-one but can be many-to-one. When the image processing apparatus is provided with a function of color clustering, besides the operator's manual designation, the area can be divided by clustering so as to designate the respective color areas.

The following is a description of a method of corresponding the same color areas of the areas divided by clustering.

The characteristics of colors except for the difference in brightness are considered to be the difference in R, G, and B. The difference in RGB (R–G, R–B) in each of the divided shadow areas is calculated and the difference in RGB of each of the divided sunny areas is calculated. These differences are compared with each other. When the difference in RGB in the shadow area is (Ra–Ga, Ra–Ba), and the difference in RGB in the sunny are is (Rb–Gb, Rb–Bb), the areas having the smallest value of $[(Ra-Ga)/(Ra-Ba)]^2-[(Rb-Gb)/(Rb-Bb)]^2$ are corresponded as the same color areas.

The characteristics of colors can be the ratio of RGB (R/G, R/B).

It is also possible to convert the RGB color space into a YIQ color space and to correspond areas having the shortest distance therebetween on the two-dimensional plane except for the luminosity Y as the same color areas.

The following is an example of the conversion function of the above-mentioned pixel distribution.

(1) Let the average of the pixel values of the shadow area be A (Ra, Ga, Ba) and the average of the pixel values of the sunny area be B (Rb, Gb, Bb). The compensated pixel value PC of the pixel value P in the shadow area can be taken as follows.

$$PC=P+(B-A)$$

This means that the pixels in the shadow area are moved in parallel across the color space.

(2) Let the average of the pixel values of the shadow area be A (Ra, Ga, Ba) and the average of the pixel values of the sunny area be B (Rb, Gb, Bb). The compensated pixel value PC of the pixel value P in the shadow area can be taken as follows.

$$PC=P \times B/A$$

Since the pixel values in the shaded portions generally have a small distribution, this conversion means an expansion of the distribution of the pixels across the color space in the shadow area.

(3) Let the average of the pixel values of the shadow area be A (Ra, Ga, Ba) and the average of the pixel values of the sunny area be B (Rb, Gb, Bb). Let the reference deviation of the pixels in the shadow area be Da and the reference deviation of the pixels in the sunny area be Db. The compensated pixel value PC of the pixel value P in the shadow area can be taken as follows.

$$PC=A+(P-B) \times Db/Da$$

In the dark shadow portion, the dispersion of the pixel values is considered smaller than that in the bright portion. This conversion means that the dispersion of the pixel values in the shadow area is adjusted to the dispersion of the pixel values in the sunny area.

Figure 15:
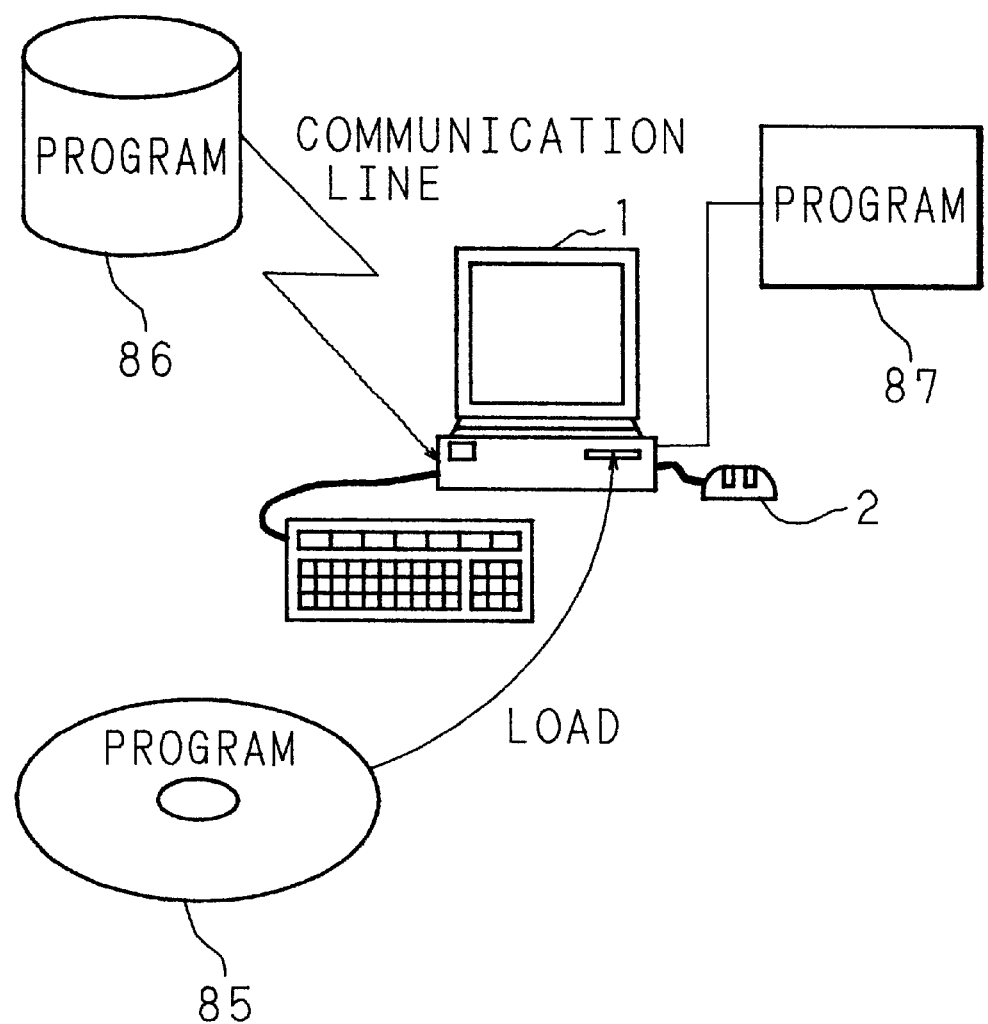
FIG. 15 is a diagram showing the hardware structure to realize the present invention.

FIG. 15 is an illustration showing the hardware structure to realize the present invention. The personal computer as the image processing apparatus of the present invention is equipped with the display 1 which displays image data or the like and the mouse 2 as a pointing device. The personal computer loads programs for conducting the above-mentioned procedure from recording media such as portable recording media 85 including magnetic disks and CD-ROM, a memory 86 installed in a center which can transfer programs by radio or wire with the personal computer, or a data processing apparatus-side memory 87 including RAM or hard disks provided to the personal computer.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method for eliminating a shadow of a photographic image containing a picture of a three-dimensional object comprising:

superimposing a three-dimensional model on the picture of the three-dimensional object contained in the image so as to fit the three-dimensional model to the picture;

designating a shadow plane of the picture of the three-dimensional object contained in the image;

estimating a position of a light source, based on a plane of the three-dimensional model superimposed on the designated plane;

searching an area on which a shadow is to be created by a rendering for the three-dimensional model based on the estimated position of the light source, and deciding that an area on which the searched out plane is superimposed is a shadow area of said image; and eliminating the shadow from the area which has been decided as the shadow area.

2. The image shadow elimination method according to claim 1, wherein said step of eliminating the shadow comprising:
   calculating a pixel distribution of an area which has been decided as a shadow area and a pixel distribution of an area other than the shadow area in said image;
   calculating a conversion function, based on said pixel distributions, for converting the pixel distribution of the shadow area into a pixel distribution in accordance with the pixel distribution of the area other than the shadow area; and
   converting the pixel distribution of the shadow area by said conversion function.

3. The image shadow elimination method according to claim 1, wherein said step of eliminating the shadow comprising:
   calculating a pixel distribution of a portion of an area which has been decided as a shadow area and a pixel distribution of a portion of an area other than the shadow area in said image, said portions being same in color;
   calculating a conversion function for converting the pixel distribution of the shadow area into a pixel distribution in accordance with the calculated pixel distribution; and
   converting the pixel distribution of the shadow area by said conversion function.

4. The image shadow elimination method according to claim 1, wherein said step of eliminating the shadow comprising:
   calculating pixel distributions of respective portions in an area which has been decided as a shadow area and pixel distributions of respective portions which have same colors as the respective portions of the shadow area, respectively in an area other than the shadow area in said image;
   calculating conversion functions for converting the pixel distributions of said respective portions in the shadow area into pixel distributions in accordance with the pixel distributions of said respective portions having the same colors in the area other than the shadow area, based on the calculated pixel distributions; and
   converting the pixel distributions of said respective portions in the shadow area by said conversion functions, respectively.

5. A method for eliminating a shadow of a photographic image containing a picture of a three-dimensional object comprising:
   superimposing a three-dimensional model on the picture of the three-dimensional object contained in the image so as to fit the three-dimensional model to the picture;
   designating a point on the picture of the three-dimensional object contained in the image and a position of the point on a shadow;
   estimating a position of a light source, based on a point and position of the three-dimensional model superimposed on the picture of the three-dimensional object corresponding to the designated point and position;
   deciding that an area on which a shadow is created by a rendering for the three-dimensional model based on the light source at the estimated position is the shadow area of said image; and
   eliminating the shadow from the area which has been decided as the shadow area.

6. The image shadow elimination method according to claim 5, wherein said step of eliminating the shadow comprising:
   calculating a pixel distribution of an area which has been decided as a shadow area and a pixel distribution of an area other than the shadow area in said image;
   calculating a conversion function, based on said pixel distributions, for converting the pixel distribution of the shadow area into a pixel distribution in accordance with the pixel distribution of the area other than the shadow area; and
   converting the pixel distribution of the shadow area by said conversion function.

7. The image shadow elimination method according to claim 5, wherein said step of eliminating the shadow comprising:
   calculating a pixel distribution of a portion of an area which has been decided as a shadow area and a pixel distribution of a portion of an area other than the shadow area in said image, said portions being same in color;
   calculating a conversion function for converting the pixel distribution of the shadow area into a pixel distribution in accordance with the calculated pixel distribution; and
   converting the pixel distribution of the shadow area by said conversion function.

8. The image shadow elimination method according to claim 5, wherein said step of eliminating the shadow comprising:
   calculating pixel distributions of respective portions in an area which has been decided as a shadow area and pixel distributions of respective portions which have same colors as the respective portions of the shadow area, respectively in an area other than the shadow area in said image;
   calculating conversion functions for converting the pixel distributions of said respective portions in the shadow area into pixel distributions in accordance with the pixel distributions of said respective portions having the same colors in the area other than the shadow area, based on the calculated pixel distributions; and
   converting the pixel distributions of said respective portions in the shadow area by said conversion functions, respectively.

9. A method for eliminating a shadow of a photographic image containing a picture of a three-dimensional object comprising:
   superimposing a three-dimensional model on the picture of the three-dimensional object contained in the image so as to fit the three-dimensional model to the picture;
   designating a position of a light source;
   searching a plane on which a shadow is to be created by a rendering for the three-dimensional model based on the designated position of the light source;
   changing the position of the light source when the shadow created by the rendering does not agree with a shadow of the image;
   deciding that the area on which the shadow is created by the rendering is the shadow area of said image, when the shadow created by the rendering agrees with the shadow of said image; and
   eliminating the shadow from the area which has been decided as the shadow area.

10. The image shadow elimination method according to claim 9, wherein said step of eliminating the shadow comprising:
- calculating a pixel distribution of an area which has been decided as a shadow area and a pixel distribution of an area other than the shadow area in said image;
- calculating a conversion function, based on said pixel distributions, for converting the pixel distribution of the shadow area into a pixel distribution in accordance with the pixel distribution of the area other than the shadow area; and
- converting the pixel distribution of the shadow area by said conversion function.

11. The image shadow elimination method according to claim 9, wherein said step of eliminating the shadow comprising:
- calculating a pixel distribution of a portion of an area which has been decided as a shadow area and a pixel distribution of a portion of an area other than the shadow area in said image, said portions being same in color;
- calculating a conversion function for converting the pixel distribution of the shadow area into a pixel distribution in accordance with the calculated pixel distribution; and
- converting the pixel distribution of the shadow area by said conversion function.

12. The image shadow elimination method according to claim 9, wherein said step of eliminating the shadow comprising:
- calculating pixel distributions of respective portions in an area which has been decided as a shadow area and pixel distributions of respective portions which have same colors as the respective portions of the shadow area, respectively in an area other than the shadow area in said image;
- calculating conversion functions for converting the pixel distributions of said respective portions in the shadow area into pixel distributions in accordance with the pixel distributions of said respective portions having the same colors in the area other than the shadow area, based on the calculated pixel distributions; and
- converting the pixel distributions of said respective portions in the shadow area by said conversion functions, respectively.

13. An image processing apparatus provided with a function of eliminating a shadow of a photographic image containing a picture of a three-dimensional object comprising:
- means for superimposing a three-dimensional model on the picture of the three-dimensional object contained in the image so as to fit the three-dimensional model to the picture;
- means for designating a shadow plane of the picture of the three-dimensional object contained in the image;
- means for estimating a position of a light source, based on a plane of the three-dimensional model superimposed on the designated plane;
- means for searching an area on which a shadow is to be created by a rendering for the three-dimensional model based on the estimated position of the light source, and deciding that an area on which the searched out plane is superimposed is a shadow area of said image; and
- means for eliminating the shadow from the area which has been decided as the shadow area.

14. The image processing apparatus according to claim 13, wherein
said means for eliminating the shadow comprises:
- means for calculating a pixel distribution of an area which has been decided as a shadow area and a pixel distribution of an area other than the shadow area in said image;
- means for calculating a conversion function, based on said pixel distributions, for converting the pixel distribution of the shadow area into a pixel distribution in accordance with the pixel distribution of the area other than the shadow area; and
- means for converting the pixel distribution of the shadow area by said conversion function.

15. The image processing apparatus according to claim 13, wherein
said means for eliminating the shadow comprises:
- means for calculating a pixel distribution of a portion of an area which has been decided as a shadow area and a pixel distribution of a portion of an area other than the shadow area in said image, said portions being same in color;
- means for calculating a conversion function for converting the pixel distribution of the shadow area into a pixel distribution in accordance with the calculated pixel distribution; and
- means for converting the pixel distribution of the shadow area by said conversion function.

16. The image processing apparatus according to claim 13, wherein
said means for eliminating the shadow comprises:
- means for calculating pixel distributions of respective portions in an area which has been decided as a shadow area and pixel distributions of respective portions which have same colors as the respective portions of the shadow area, respectively in an area other than the shadow area in said image;
- means for calculating conversion functions for converting the pixel distributions of said respective portions having the same colors in the shadow area into pixel distributions in accordance with the pixel distributions of said respective portions in the area other than the shadow area, based on the calculated pixel distributions; and
- means for converting the pixel distributions of said respective portions in the shadow area by said conversion functions, respectively.

17. An image processing apparatus provided with a function of eliminating a shadow of a photographic image containing a picture of a three-dimensional object comprising:
- means for superimposing a three-dimensional model on the picture of the three-dimensional object contained in the image so as to fit the three-dimensional model to the picture;
- means for designating a point on the picture of the three-dimensional object contained in the image and a position of the point on a shadow;
- means for estimating a position of a light source, based on a point and position of the three-dimensional model superimposed on the picture of the three-dimensional object corresponding to the designated point and position;
- means for deciding that an area on which a shadow is created by a rendering for the three-dimensional model based on the light source at the estimated position is the shadow area of said image; and means for eliminating the shadow from the area which has been decided as the shadow area.

18. The image processing apparatus according to claim 17, wherein
said means for eliminating the shadow comprises:
means for calculating a pixel distribution of an area which has been decided as a shadow area and a pixel distribution of an area other than the shadow area in said image;
means for calculating a conversion function, based on said pixel distributions, for converting the pixel distribution of the shadow area into a pixel distribution in accordance with the pixel distribution of the area other than the shadow area; and
means for converting the pixel distribution of the shadow area by said conversion function.

19. The image processing apparatus according to claim 17, wherein
said means for eliminating the shadow comprises:
means for calculating a pixel distribution of a portion of an area which has been decided as a shadow area and a pixel distribution of a portion of an area other than the shadow area in said image, said portions being same in color;
means for calculating a conversion function for converting the pixel distribution of the shadow area into a pixel distribution in accordance with the calculated pixel distribution; and
means for converting the pixel distribution of the shadow area by said conversion function.

20. The image processing apparatus according to claim 17, wherein
said means for eliminating the shadow comprises:
means for calculating pixel distributions of respective portions in an area which has been decided as a shadow area and pixel distributions of respective portions which have same colors as the respective portions of the shadow area, respectively in an area other than the shadow area in said image;
means for calculating conversion functions for converting the pixel distributions of said respective portions in the shadow area into pixel distributions in accordance with the pixel distributions of said respective portions having the same colors in the area other than the shadow area, based on the calculated pixel distributions; and
means for converting the pixel distributions of said respective portions in the shadow area by said conversion functions, respectively.

21. An image processing apparatus provided with a function of eliminating a shadow of a photographic image containing a picture of a three-dimensional object comprising:
means for superimposing a three-dimensional model on the picture of the three-dimensional object contained in the image so as to fit the three-dimensional model to the picture;
means for designating a position of a light source;
means for searching an area on which a shadow is to be created by a rendering for the three-dimensional model based on the designated position of the light source;
means for changing the position of the light source when the shadow created by the rendering does not agree with a shadow of the image;
means for deciding that the area on which the shadow is created by the rendering is the shadow area of said image, when the shadow created by the rendering agrees with the shadow of said image; and
means for eliminating the shadow from the area which has been decided as the shadow area.

22. The image processing apparatus according to claim 21, wherein
said means for eliminating the shadow comprises:
means for calculating a pixel distribution of an area which has been decided as a shadow area and a pixel distribution of an area other than the shadow area in said image;
means for calculating a conversion function, based on said pixel distributions, for converting the pixel distribution of the shadow area into a pixel distribution in accordance with the pixel distribution of the area other than the shadow area; and
means for converting the pixel distribution of the shadow area by said conversion function.

23. The image processing apparatus according to claim 21, wherein
said means for eliminating the shadow comprises:
means for calculating a pixel distribution of a portion of an area which has been decided as a shadow area and a pixel distribution of a portion of an area other than the shadow area in said image, said portions being same in color;
means for calculating a conversion function for converting the pixel distribution of the shadow area into a pixel distribution in accordance with the calculated pixel distribution; and
means for converting the pixel distribution of the shadow area by said conversion function.

24. The image processing apparatus according to claim 21, wherein
said means for eliminating the shadow comprises:
means for calculating pixel distributions of respective portions in an area which has been decided as a shadow area and pixel distributions of respective portions which have same colors as the respective portions of the shadow area, respectively in an area other than the shadow area in said image;
means for calculating conversion functions for converting the pixel distributions of said respective portions in the shadow area into pixel distributions in accordance with the pixel distributions of said respective portions having the same colors in the area other than the shadow area, based on the calculated pixel distributions; and
means for converting the pixel distributions of said respective portions in the shadow area by said conversion functions, respectively.

25. A recording medium having computer readable program code means for use with an image processing apparatus provided with a function of eliminating a shadow of a photographic image containing a picture of a three-dimensional object comprising:
a program code means for causing said apparatus to receive an operation for superimposing a three-dimensional model on the picture of the three-dimensional object contained in the image so as to fit the three-dimensional model to the picture;
a program code means for causing said apparatus to receive designation of a shadow plane of the picture of the three-dimensional object contained in the image;
a program code means for causing said apparatus to estimate a position of a light source, based on a plane of the three-dimensional model superimposed on the designated plane;

a program code means for causing said apparatus to search an area on which a shadow is to be created by a rendering for the three-dimensional model based on the estimated position of the light source and to decide that an area on which the found plane is superimposed is a shadow area of said image; and a program code means for causing said apparatus to eliminate the shadow from the area which has been decided as the shadow area.

26. An image processing apparatus provided with a function of eliminating a shadow of photographic image containing a picture of a three-dimensional object comprising:

a unit superimposing a three-dimensional model on the picture of the three-dimensional object contained in the image so as to fit the three-dimensional model to the picture;

a unit designating a shadow plane of the picture of the three-dimensional object contained in the image;

a unit estimating a position of a light source, based on a plane of the three-dimensional model superimposed on the designated plane;

a unit searching an area on which a shadow is to be created by a rendering for the three-dimensional model based on the estimated position of the light source, and deciding that an area on which the searched out plane is superimposed is a shadow area of said image; and a unit eliminating the shadow from the area which has been decided as the shadow area.

27. An image processing apparatus provided with a function of eliminating a shadow of a photographic image containing a picture of a three-dimensional object comprising:

a unit superimposing a three-dimensional model on the picture of the three-dimensional object contained in the image so as to fit the three-dimensional model to the picture;

a unit designating a point on the picture of the three-dimensional object contained in the image and a position of the point on a shadow;

a unit estimating a position of a light source, based on a point and position of the three-dimensional model superimposed on the picture of the three-dimensional object corresponding to the designated point and position;

a unit deciding that an area on which a shadow is created by a rendering for the three-dimensional model based on the light source at the estimated position is the shadow area of said image; and a unit eliminating the shadow from the area which has been decided as the shadow area.

28. An image processing apparatus provided with a function of eliminating a shadow of a photographic image containing a picture of a three-dimensional object comprising:

a unit superimposing a three-dimensional model on the picture of the three-dimensional object contained in the image so as to fit the three-dimensional model to the picture;

a unit designating a position of a light source;

a unit searching an area on which a shadow is to be created by a rendering for the three-dimensional model based on the designated position of the light source;

a unit changing the position of the light source when the shadow created by the rendering does not agree with a shadow of the image;

a unit deciding that the area on which the shadow is created by the rendering is the shadow area of said image, when the shadow created by the rendering agrees with the shadow of said image; and a unit eliminating the shadow from the area which has been decided as the shadow area.

29. A recording medium having computer readable program code means for use with an image processing apparatus provided with a function of eliminating a shadow of a photographic image containing a picture of a three-dimensional object comprising:

program code causing said apparatus to receive an operation for superimposing a three-dimensional model on the picture of the three-dimensional object contained in the image so as to fit the three-dimensional model to the picture;

program code causing said apparatus to receive designation of a shadow plane of the picture of the three-dimensional object contained in the image;

program code causing said apparatus to estimate a position of a light source, based on a plane of the three-dimensional model superimposed on the designated plane;

program code causing said apparatus to search an area on which a shadow is to be created by a rendering for the three-dimensional model based on the estimated position of the light source and to decide that an area on which the found plane is superimposed is a shadow area of said image; and program code causing said apparatus to eliminate the shadow from the area which has been decided as the shadow area.

* * * * *